United States Patent Office 3,427,282
Patented Feb. 11, 1969

3,427,282
USE OF SELECTED 4,4'-METHYLENE-BIS(2-ALKYL-ANILINES) AS CURING AGENT FOR EPOXY RESINS
Norman K. Sundholm, Middlebury, Conn., assignor to Uniroyal, Inc., New York, N.Y., a corporation of New Jersey
No Drawing. Filed Mar. 28, 1967, Ser. No. 626,395
U.S. Cl. 260—47
Int. Cl. C08g 30/14
4 Claims

ABSTRACT OF THE DISCLOSURE

Epoxy resins are cured with 4,4'-methylene-bis(2-alkylanilines) having the structural formula:

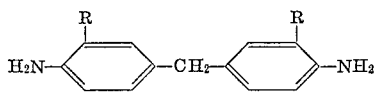

where R is an ethyl group or a secondary alkyl group having 3 to 6 carbon atoms.

BACKGROUND OF THE INVENTION

This invention relates to a novel process for curing epoxy resins and to epoxy resin-curing agent blends. More particularly, the invention relates to the use of aromatic amine curing agents for epoxy resins which have longer pot lives than the commonly used 4,4'methylenedianiline and metaphenylenediamine, and which readily blend with liquid resins because the curing agents are either liquid, or solids which readily dissolve in the resins at processing temperatures.

The epoxy resins may be polymeric or monomeric and are mixtures of molecules containing the epoxy group

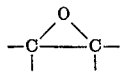

which serves as a point for chain extension and cross-linking. On the average more than one epoxy group is present per molecule. The concentration of epoxy groups is generally denoted by the term "epoxide equivalent," which is the number of grams of resin containing one gram equivalent of epoxide.

Until epoxy resins are cured they have no useful structural property. After cure they become tough, hard, infusible and resistant to structural distortion at elevated temperatures.

A description of the synthesis, characterization, curing and application of epoxy resins is presented in the next Epoxy Resins by H. Lee and K. Neville, McGraw-Hill Book Company, Inc., 1957. Most of the commercial resins are the epoxy ethers formed by the reaction of epichlorohydrin with a polyhydric phenol or a polyalcohol in the presence of an agent, such as sodium hydroxide. The polyhydric phenol used to the greatest extent is 2,2-bis(4-hydroxyphenyl)propane, commonly known as bisphenol A. However, the resin need not be an epoxy ether but may be a polyepoxide formed by the epoxidation of a polyene, such as dicyclopentadiene and 4-vinylcyclohexene, a homopolymerized diene, such as polybutadiene, a glyceride of an unsaturated fatty acid, such as soybean oil, etc.

Epoxies may be cured in two ways: catalysis or copolymerization. In catalytic curing, the epoxy molecules react directly with each other in a reaction started by a catalyst; such systems are said to be homopolymerized.

Copolymerized epoxies have hardeners mixed into the resins. These hardeners contain reactive groups which unite with the epoxy groups and become a vital part of the cured material. Epoxy resin-hardener systems are said to be heteropolymerized.

A variety of chemical compounds act as curing agents for epoxy resins. The two major classes are the organic amines and various derivatives thereof, and organic di-, basic and polybasic acids and acid anhydrides. Examples of the amine class are 4,4'-methylenedianiline, metaphenylenediamine, 4,4'-diaminodiphenyl sulfone, diethylenetriamine, diethylaminopropylamine, piperidine, triethylamine, benzyldimethylamine, 2,4,6-tris(dimethylaminomethyl)phenol and its tri-2-ethylhexoate salt, dicyandiamide, boron trifluoride-monoethylamine complex, and triethanolamine borate. Examples of the acid and anhydride class are oxalic acid, phthalic anhydride, hexahydrophthalic anhydride, dodecenyl succinic anhydride and pyromellitic dianhydride.

In commercial practice the curing agent is usually mixed as a liquid with the liquid epoxy resin, the resin being heated if necessary. The blending operation is facilitated if the curing agent is a liquid or low-melting solid. It is also advantageous for the resin blend containing the curing agent to have a long pot life. The latter is particularly true if the curing agent is added to an epoxy resin which requires heating to make it sufficiently liquid for easy blending, because, with a long pot life, cure may be avoided during the blending and application (casting, coating, laminating, molding, etc.) operations. The blending of the curing agent and epoxy resin desirably produces little heat. Otherwise, the heat generated from the curing reaction in large batches may become excessive and uncontrollable.

It is an object of the present invention to provide improved curing agents.

It is a further object of this invention to provide mixtures of epoxy resins and curing compounds which have long pot lives.

It is a still further object of this invention to provide an improved method of curing epoxy resins.

Other objects, features and advantages will be apparent from the following description of the invention.

SUMMARY OF THE INVENTION AND DESCRIPTION OF PREFERRED EMBODIMENTS

Certain organic compounds have been found, which among other favorable properties, impart long pot lives to epoxy resin blends, and give the epoxy resins cured with them good resistance to heat distortion. Such compounds are 4.4'-methylene-bis(2-alkylanilines) which have the following structural formula:

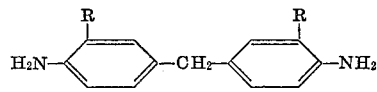

in which R is an ethyl group or a secondary alkyl group containing 3 to 6 carbon atoms. The preferred groups are ethyl, isopropyl, sec-butyl and 2-hexyl. The 4,4'-methylene-bis(2-methylaniline) compound is unsatisfactory because of its high melting point.

The compounds may be synthesized by the condensation of the corresponding 2-substituted anilines with formaldehyde in the presence of dilute mineral acid, using greater than a 2 to 1 molar ratio of 2-substituted aniline to formaldehyde. The substituted anilines, if not available, may be prepared by the alkylation of aniline with the appropriate olefin in the presence of aluminum and aluminum chloride using the procedure described by Stroh, Ebersberger, Haberland and Hahn on p. 240 of the text Newer Methods of Preparative Organic Chemistry, edited by W. Foerst, Academic Press, 1963.

The blends made with the curing agents of the present invention and epoxy resins have longer pot lives than those of blends made with the commonly used curing agents, 4,4'-methylenedianiline and meta-phenylenediamine.

It is another advantageous feature that the compounds of the present invention have melting points which are lower than the commonly used amine curing agents 4,4'-methylenedianiline and meta-phenylenediamine, some being liquids at room temperature (20–25° C.).

Specific examples of the practice of the invention are given below in order to disclose more clearly the nature of the invention. It should be understood, however, that this is done solely by way of example and is intended neither to delineate the scope of the invention nor limit the ambit of the appended claims.

Example I.—Preparation of 4,4-methylene-bis (2-ethylaniline)

A solution of 135 grams (1.12 moles) of 2-ethylaniline, 90 ml. of concentrated hydrochloric acid and 200 ml. of water was cooled to 18° C. with stirring; a solid crystallized out. Then 37% formaldehyde (40.5 grams, 0.50 mole) was added, and the mixture was heated at 50–60° C. for 5 hours. It was clear for the first 4 hours, but then a solid crystallized out. The solid was collected by filtration, and was dissolved in 1.5 liters of water; a solution of 32.3 grams of sodium hydroxide in 200 ml. of water was added. The oil produced was separated, dried with solid potassium hydroxide and distilled. The fraction boiling at 199–200° C. (0.7 mm.) was collected; it consisted of 82 grams of amber oil. The oil when refrigerated gave a solid melting at 44–46° C. Recrystallization from 1:1 hexane-benzene gave colorless crystals melting at 45.5–46.5° C.

Analysis.—Calcuated for $C_{17}H_{22}N_2$: C, 80.31; H, 8.66; N, 11.02. Found: C, 80.41; H, 8.58; N, 10.99.

Example II.—Preparation of 4,4'-methylene-bis (2-isopropylaniline)

To a stirred solution of 101 grams (0.75 mole) of 2-isopropylaniline, 62.5 ml. of concentrated hydrochloric acid and 400 ml. of water of 60° C. were added 16.2 grams (0.20 mole) of 37% formaldehyde during 1 hour. The solution was heated at 60° C. for 3 hours and then 50 grams of 28–30% aqueous ammonia were added. The resulting oil was separated and subjected to steam distillation to remove unreacted 2-isopropylaniline. The residue was dried with solid potassium hydroxide and distilled. The fraction boiling at 173–175° C. (0.3 mm.) was collected. It consisted of 36.5 grams of pale yellow oil.

Analysis.—Calcuated for $C_{19}H_{26}N_2$: C, 80.85; H, 9.22; N, 9.93. Found: C, 81.11; H, 9.39; N, 10.12.

Example III.—Preparation of 4,4'-methylene-bis (2-sec-butylamine)

A stirred solution of 59.6 grams (0.40 mole) of 2-sec-butylaniline, 400 ml. of water and 33.4 ml. of concentrated hydrochloric acid at 60° C. were added 8.1 grams (0.10 mole) of 37% formaldehyde during ½ hour. The solution was heated at 60° C. for 3 hours, and then 30 grams of 28–30% aqueous ammonia were added. The resulting oil was separated, dried with solid potassium hydroxide and distilled. The fraction boiling at 186–188° C. (0.3 mm.) was collected; it consisted of 11 grams of yellow oil.

Analysis.—Calcuated for $C_{21}H_{28}N_2$: C, 81.82; H, 9.99; N, 9.09. Found: C, 81.78; H, 9.63; N, 9.03.

Unreacted 2-sec-butylaniline was recovered having a B.P. 53–56° C. (0.3 mm.).

Example IV.—Preparation of 4,4'-methylene-bis[2-(2-hexyl)aniline]

2-(2-hexyl)aniline was prepared from aniline and 1-hexene by the procedure given in the Stroh et al. reference cited above. It was obtained as an oil boiling at 68–71° C. (0.2 mm.).

The procedure for the preparation of the diamine was the same as that of Example III using 127.5 grams (0.72 mole) of 2-(2-hexyl)aniline, 60 ml. of concentrated hydrochloric acid, 500 ml. of water and 21.9 grams 0.27 mole) of 37% formaldehyde. The compound obtained boiled at 200–202° C. (0.2 mm.) and consisted of 36 grams of yellow oil.

Analysis.—Calcuated for $C_{25}H_{38}N_2$: C, 81.97; H, 10.38; N, 7.65. Found: C, 82.05; H, 10.36; N, 7.92.

Example V.—Preparation of 4,4'-methylene-bis [2-(2-octyl)aniline]

2-(2-octyl)aniline was prepared from aniline and 1-octene by the procedure given in the Stroh et al. reference cited above. The product was obtained as an oil boiling at 137–140° C. (5 mm.). To a stirred solution of 205 grams (1 mole) of this amine, 83.3 ml. of concentrated hydrochloric acid and 500 ml. of ethanol at 60–65° C. were added 20.3 grams (0.25 mole) of 37% formaldehyde during 1 hour. The solution was heated at 60–65° C. for 2 hours, and then 500 ml. of solvent removed by distilaltion. Water (300 ml.) and 75 grams of 28–30% aqueous ammonia were added. The resulting oil was separated and subjected to steam distillation to remove unreacted 2-(2-octyl)aniline. The residue was dried with solid potassium hydroxide and distilled. The fraction boiling at 227–231° C. (0.5 mm.) was collected; it consisted of 45 grams of yellow oil.

Analysis.—Calcuated for $C_{29}H_{46}N_2$: C, 82.47; H, 10.90; N, 6.64. Found: C, 82.29; H, 11.30; N, 6.64.

Example VI

The compounds of Examples I–V and two commonly used diamine curing agents were tested as curing agents for epoxy resins using two typical commercial epoxy resins and an experimental resin. One commercial resin was Epon 828 (manufactured by Shell Chemical Co.), derived from epichlorohydrin and bisphenol A, having an epoxide equivalent of 188 and an approximate average molecular weight of 380.

The equivalent weights of the new curing agents, the weight in grams that reacts stoichiometrically with 188 grams of Epon 828, were calculated by dividing their molecular weights by 4 since each of the 4 hydrogen atoms attached to the nitrogen atoms can react with one epoxy group. Calculations were made for weight of curing agent and resin required to give a mixture weighing about 40 grams. For example, 11.3 grams of 4,4'-methylene-bis(2-isopropylaniline) and 30.0 grams of Epon 828 were used.

The weighed quantity of resin heated to 80° C. was added to the weighed quantity of curing agent heated to 80° C. The mixture was blended, centrifuged to deaerate it, and poured into a mold having inside dimensions of 7 x ½ x ½ inches. The resin-curing agent blends were cured by heating at 85° C. for 2 hours, then at 150° C. for 16 hours. The cured bars were removed and tested for heat-distortion temperature using the procedure of ASTM D648–56. The results are given in Table I. While the heat-distortion temperatures of the cured compositions utilizing the compounds of the present invention were lower than that of 4,4'methylenedianiline-cured compositions, they are useful for many applications, especially those compositions having a heat-distortion temperature above about 100° C.

The same test was run using an experimental resin having an epoxide equivalent of 263, and prepared from epichlorohydrin and bisphenol A according to the procedure of Example I of U.S. Patent 2,651,589.

The same test was repeated using D.E.N. 431 (manufactured by The Dow Chemical Co.) an epoxy novolac resin having an epoxide equivalent of 175. The results are given in Table I.

The pot lives of the new curing agents were determined in Epon 828. Ten grams of resin at 100° C. were added to the equivalent amount of curing agent at 100° C. After mixing, the blends were placed in an oven at 100° C. and the time required for them to become unpourable was determined. These results are given in Table I.

The pot lives of the blends of the curing agents of this invention are longer than those of 4,4'methylenedianiline and meta-phenylenediamine, which under the conditions of test were 25 and 14 minutes, respectively. Their peak exothermic values were also markedly higher, 127° C. and 146° C., respectively, compared to that of the highest of the curing agents of this invention, 109° C. for that of 4,4'-methylene-bis(2-ethylaniline). For the 2-sec-butyl, 2-isopropyl and 2-(2-hexyl) compounds it was 108° C., 107° C. and 105° C., respectively. These properties permit the use of longer working times and larger batches of the resin-curing agent mixtures using the new curing agents.

TABLE I

| Diamine | Heat-distortion temperature, ° C. | | | Pot life, min. | Melting point, ° C. |
| --- | --- | --- | --- | --- | --- |
| | In Epon 828 | In exptl. resin | In E.D.N. 431 | | |
| 4,4'-methylenedianiline | 165 | 129 | 134 | 25 | 93 |
| Meta-phenylenediamine | 167 | | 157 | 14 | 63 |
| 4,4'-methylenebis-(2-ethylaniline) | 120 | 99 | 124 | 65 | 45.5–46 5 |
| 4,4'-methylenebis-(2-isopropylaniline) | 116 | 111 | | 80 | (1) |
| 4,4'-methylenebis(2-sec butylaniline) | 125 | | | 85 | (1) |
| 4.4'-methylenebis[2-(2-hexyl)-aniline] | 101 | | 108 | 120 | (1) |
| 4,4'-methylenebis[2-(2-octyl)-aniline] | 89 | 83 | | 150 | (1) |

[1] These compounds are liquid at room temperature, 20–25° C.

It is to be understood that various other compounding ingredients may be used with the epoxy resin and curing agents. The other ingredients include diluents, fillers, resinous modifiers, plasticizers and flexibilizers. The curing temperature is in the range of about 60–200° C.

The terms and expressions which have been employed are used as terms of description and not of limitation, and there is no intention in the use of such terms and expressions, of excluding any equivalents of the features shown and described, or portions thereof, but it is recognized that various modifications are possible within the scope of the invention claimed.

Having thus described my invention, what I claim and desire to protect by Letters Patent is:

1. A curable epoxy resin composition comprising at least one epoxy resin containing, on the average, more than one 1,2-epoxide group per molecule and a curing agent having the structural formula:

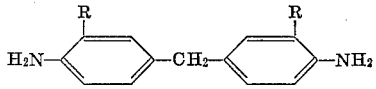

where R is an ethyl group or a secondary alkyl group containing 3 to 6 carbon atoms.

2. A composition as defined in claim 1 where R is at least one member selected from the class consisting of ethyl, isopropyl, sec-butyl and 2-hexyl groups.

3. A cured epoxy resin composition prepared by the steps of:
   (A) Mixing at least one epoxy resin containing, on the average, more than one 1,2-epoxide group per molecule and a curing agent having the structural formula:

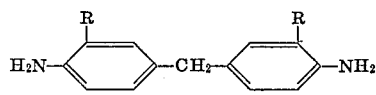

where R is an ethyl group or a secondary alkyl group containing 3 to 6 carbon atoms and
   (B) Heating the mixture at curing temperatures until cured.

4. A composition as defined in claim 3 where R is at least one member selected from the class consisting of ethyl, isopropyl, sec-butyl and 2-hexyl groups.

References Cited

UNITED STATES PATENTS 2,866,768  12/1958  Bolstad.

WILLIAM H. SHORT, *Primary Examiner.*

T. D. KERWIN, *Assistant Examiner.*

U.S. Cl. X.R.

117—161; 161—184; 260—2, 59, 94.7, 404.5, 570, 830